3,574,179
PROCESS FOR THE PRODUCTION OF HIGHLY CRYSTALLINE POLYOLEFINS

Shotaro Sugiura, Haruo Ueno, Hideo Ishikawa, and Takefumi Yamo, Ube-shi, and Tuneo Shimamura, Onoda-shi, Japan, assignors to Ube Industries, Ltd., Ube-shi, Japan
No Drawing. Filed Dec. 9, 1968, Ser. No. 782,424
Int. Cl. C08f 1/56, 3/10
U.S. Cl. 260—93.7      7 Claims

ABSTRACT OF THE DISCLOSURE

A process for producing crystalline poly(alphaolefins) which comprises polymerizing alpha-olefins by contacting them with a three-component catalyst system obtained from an organoaluminum compound, a titanium halide and a mercaptide of a metal selected from the class consisting of the metals of Groups Ia and b, IIb, IVb, VIIa and VIII of the Periodic Table of Elements.

---

This invention relates to a process for producing highly crystalline polyolefins from alpha-olefins using a new catalyst system.

More specifically, this invention relates to a process for producing solid highly crystalline poly(alpha-olefins) which comprises polymerizing alpha-olefins by contacting them with a three-component catalyst system obtained from an organoaluminum compound, a titanium halide and a mercaptide of a metal selected from the class consisting of the metals of Groups Ia and b, IIb, IVb, VIIa and VIII of the Periodic Table of Elements. The periodic table, as used herein, will be in conformance with the periodic table of Mendeleev (Kirk & Othmer Encyclopedia of Chemical Technology, 2nd ed., vol. 8, page 96 (1965)).

It is known that crystalline polyolefins can be obtained by polymerizing the alpha-olefins in the presence or absence of an inert organic solvent using a catalyst system obtained from the organic compounds of the metals of Groups I–III and the halides of the transition metals of Groups IV–VI of the Periodic Table of Elements. For example, in polymerizing propylene, the boiling heptane-insoluble polymer produced is 75–85% of the total polymer formed when a catalyst obtained from triethylaluminum and titanium trichloride is used, while 80–90% is produced when a catalyst obtained from diethylaluminum monochloride and titanium trichloride is used. Thus, there still is contained 10–25% of amorphous polymer in the crystalline polymer. The crystalline polymer containing a considerable amount of amorphous polymer, when used in its as-obtained state as film, fiber or after processing into other articles is not desirable from the standpoint of the properties of the article. Hence, it is necessary to extract and remove the amorphous polymer from the polymeric mixture so far as feasible using an organic solvent such as acetone, ether and heptane. In consequence, the loss due to the formation of the useless amorphous polymer and the increase in costs resulting from the necessity of extracting the amorphous polymer cannot be avoided.

We have found that when a mixture obtained by adding to the titanium trihalide and organoaluminum compound, a specific third component, i.e. a metal mercaptide to be fully described hereinafter, is used as catalyst in the polymerization of propylene, the content of the amorphous polymer in the resulting polypropylene could be reduced to a marked degree, for example, the content of the boiling heptane-insoluble polymer could be raised to more than about 95%.

It is therefore an object of the present invention to provide a process for producing polyolefins of high crystallinity and superior stereoregularity. Another object is to provide a process for producing polyolefins wherein the resulting polyolefins, for example, polypropylene, can be used directly in obtaining the final shaped articles such as fiber, film, etc., without the necessity for the step of extracting the amorphous polymer with an organic solvent. The foregoing object is achieved by polymerizing alpha-olefins using in accordance with the invention process a catalyst obtained by mixing together an organoaluminum compound, a titanium halide and a metal mercaptide of a metal selected from the class consisting of the metals of Groups Ia and b, IIb, IVb, VIIa and VIII of the Periodic Table.

Thus, the content of the amorphous polymer in the crystalline poly(alpha-olefins) produced by the process of this invention is small. For example, the polypropylene obtained by polymerizing propylene in accordance with the invention process using diethylaluminum monochloride as the organoaluminum compound contains above about 95% of boiling heptane-insoluble polymer. Hence, the present invention is advantageous in that the amorphous polymer extraction step, which has been customarily practiced heretofore, can be omitted, since the polypropylene obtained can be processed as-obtained, making it possible to put the product immediately to practical use without this extra step.

As the organoaluminum compound, one of the components of the catalyst used in the invention process, used are the compounds of the formula $$AlR_nX_{3-n}$$

wherein R is an alkyl group of not more than 8 carbon atoms, preferably methyl, ethyl, propyl and butyl, X is halogen, chlorine being especially preferred, and $n$ is either 3 or 2; particularly preferred being triethylaluminum and diethylaluminum monochloride. In polymerizing propylene, dialkylaluminum monohalide is conveniently used, whereas in polymerizing butene-1, trialkylaluminum is preferred.

As the titanium trihalide, one of the other components of the catalyst, the chloride, iodide and bromide of trivalent titanium are preferred, and especially preferred is titanium trichloride. Further, as these titanium trihalides, those which contain in part other constituents, for example, the titanium trichloride obtained by reducing titanium tetrachloride with aluminum and containing aluminum chloride in a mole ratio of about 3:1 or that obtained by reducing titanium tetrachloride with an organoaluminum compound can also be effectively used. Again, these halides which have been activated by means of a ball-milling treatment also give good results.

As the metal mercaptide, the third component of the catalyst, usable are the metal mercaptides of the formula $$M(SR')_m$$

wherein R' is a hydrocarbon group of not more than 20 carbon atoms, M is a metal selected from the class consisting of the metals of Groups Ia, IIb, IVb, VIIa and VIII of the Periodic Table, and $m$ is a number equal to the valence of the metal. In the foregoing formula the group R' being a hydrocarbon group of not more than 20 carbon atoms is preferably an alkyl group of not more than 20 carbon atoms such as methyl, ethyl, propyl, butyl, decyl, and lauryl; an aryl group of 6–12 carbon atoms such as phenyl, tolyl, xylyl, naphthyl and methylnaphthyl; and an aralkyl group of 7–20 carbon atoms such as benzyl, methylbenzyl, phenetyl, phenylnonyl and phenyldodecyl.

It goes without saying that the several groups R' in these metal mercaptides may either be the same or different.

The metal M, for example, may be Li, Na, K, Cu, Ag, Au, Zn, Cd, Hg, Ge, Sn, Pb, Mn, Fe, Co or Ni.

These metal mercaptides are synthesized by processes which per se are known. For example, the synthesis can be accomplished by reacting the mercaptans with the metals as such, e.g. sodium or potassium; the metal halides, e.g. copper halide, cobalt halide, iron halide, cadmium halide; the metal oxides, e.g. mercuric oxide (HgO); the organometallic compounds, e.g. butyl lithium; etc.

The organoaluminum compound and the titanium halide are preferebaly in a proportion, say, of 0.1–10 mols of the titanium halide to one mol of the organoaluminum compound.

On the other hand, in the case of the mercaptide, since its addition in a great amount inhibits the polymerization reaction, the amount of its addition is naturally restricted. As this polymerization reaction inhibitive action is not necessarily the same depending upon the polymerization temperature, class of catalyst and other polymerization condition, the optimum amount to be added of the mercaptide cannot be determined unequivocally. In short, the addition should be made under given polymerization conditions in an amount of the order as will not cause a pronounced decline in the polymerization speed. When the amount added of the mercaptide is too small, the effects to be had from the addition are not realized. Generally speaking, the mercaptide is preferably used at the rate of 0.005–5 mols, and particularly 0.01–1 mol, to each mol of the organoaluminum compound.

There is no particular restrictions as to the conditions of preparing the catalyst in the present invention. The preparation of the catalyst is carried out by admixing the aforesaid three components at the same time, or in order, with an inert organic solvent. The catalyst may be prepared in advance externally of the reaction system, or it may be prepared inside the reaction system. As compared with the catalysts in which the aforesaid metal mercaptide is not incorporated, the invention catalyst is featured in that it provides polyolefins having exceedingly high crystallinity and stereoregularity, i.e. polyolefins whose boiling heptane-soluble polymer is very small.

The alpha-olefins usable in the present invention are those of the formula

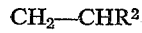

$$CH_2=CHR^2$$

wherein $R^2$ is an alkyl group of 1–4 carbon atoms, mixtures of the aforesaid olefins, or mixtures of said olefins with ethylene in an amount that will provide in the resulting polyolefins no more than up to 10 mol percent of polymerized ethylene. As the foregoing monoolefins, included are propylene, butene-1 and 4-methyl pentene-1. According to the invention process, these alpha-olefins can be homopolymerized or they can be random- or block-copolymerized. When the alpha-olefins are to be random-copolymerized, it is necessary that the amount of the comonomer be held to below about 10 mol percent for ensuring that the resulting copolymers are crystalline. Further, it is possible in the present invention to use ethylene as a comonomer, provided that it is used in a range that does not substantially decrease the crystallinity of the resulting polymer. In this case, the amount of ethylene used must be one which will provide no more than up to 10 mol percent of polymerized ethylene in the resulting polyolefin.

In practicing the process of this invention, other additives such, for example, as hydrogen, can also be incorporated for adjusting the molecular weight of the resulting polyolefins.

In carrying out the invention process, the hereinbefore described catalyst is dispersed either in an inert solvent (e.g. an aliphatic hydrocarbon such as hexane, heptane, butane and propane or an aromatic hydrocarbon such as benzene, and toluene and the halogenated derivatives thereof such as chlorobenzene) or in the liquid alpha-olefin to be used as the monomer, and the polymerization of the alpha-olefins is carried out in this system in an atmosphere of an inert gas, avoiding contact with air. The alpha-olefins can be introduced into the reaction system either in a liquid or gaseous state.

Further, it is also possible to carry out the polymerization reaction using the saturated aliphatic hydrocarbons entrained with the alpha-olefins, for example, propane contained in propylene, dispensing with the use of other inert solvents besides that contained.

The polymerization temperature conveniently used is 0–150° C., and particularly 20–80° C., and a suitable pressure ranges from normal atmospheric pressure to 100 atmospheres.

The following examples are given for further illustrating the invention process. In the examples, the proportion in which the highly crystalline polymer was contained in the resulting polymer was indicated in the following manner. In the case of polypropylene, the resulting polymer was extracted with boiling heptane for 25 hours, whereas in the case of polybutene-1, the polymer was extracted with boiling ether for the same period of time. The amount of the extraction residue was used to indicate the proportion in which the highly crystalline polymer was contained. On the other hand, the inherent viscosity of the polymer was measured in tetralin in a 135° C. constant temperature tank.

EXAMPLE 1

The air inside of a stirrer-equipped stainless steel 500-ml. autoclave was thoroughly purged with nitrogen gas, following which the autoclave was charged with 300 ml. of n-heptane, 0.50 gram of AA type titanium trichloride ($3TiCl_3 \cdot AlCl_3$), 0.90 gram of diethylaluminum monochloride and 28 mg. of copper ethyl mercaptide. Propylene was continuously introduced and polymerized by maintaining a polymerization temperature of 60° C. and pressure of 2 kg./cm.$^2$ gauge. Two hours after the introduction of the propylene was started, the autoclave was opened and the catalyst was decomposed by adding a 5% methanol solution of hydrochloric acid. The resulting polypropylene was withdrawn, thoroughly washed with a 50:50 methanol-isopropanol mixture, and thereafter dried in vacuum. 16.1 grams of polypropylene whose boiling heptane-insoluble portion was 95.4% and inherent viscosity was 3.0 were obtained.

EXAMPLES 2–27 AND CONTROLS 1–4

The polymerization reaction was carried out as in Example 1, except that the titanium trihalide, organoaluminum compound and metal mercaptide indicated in Table I, below, were used in the amounts indicated therein. The results obtained are shown in said Table I.

As control, the experiment was carried out in similar manner on the several classes of titanium halides and organoaluminum compounds used in the foregoing examples but without using the metal mercaptides. The results obtained in this case are also shown in Table I.

It is apparent from the results shown in Table I that the boiling heptane-insoluble portion of the resulting polypropylene can be improved to a marked degree by the addition of the metal mercaptide.

EXAMPLES 28–30 AND CONTROLS 5 AND 6

The inside of the apparatus described in Example 1 was thoroughly purged with nitrogen gas, after which the apparatus was charged with a mixture obtained by admixing 5 ml. of n-heptane with the catalyst components indicated in Table II. On charging 84 gram of liquid propylene, the autoclave was closed and the polymerization was carried out under the conditions indicated in Table II. After treating the resulting reaction product as in Example 1, polypropylene was obtained.

As control, the polymerization reaction was carried out using the same catalyst but without the addition thereto of the metal mercapide. The results obtained in this case are also shown in Table II.

Polypropylene whose content of the boiling heptane-insoluble portion was greater was obtained in the case where the metal mercaptide was added than in the case where it was not added.

EXAMPLES 31–40 AND CONTROLS 7–9

Butene-1 was polymerized under the conditions indicated in Table III, below, using the catalyst components indicated therein. Thereafter, the resulting reaction product was treated as in Example 1 to obtain polybutene-1.

Butene-1 was also polymerized in similar manner using the same catalyst but in which was not contained the metal mercaptide.

The results obtained are shown in Table III.

Polybutene-1 whose content of the boiling ether-insoluble portion was greater was obtained by the addition of the metal mercaptide to the catalyst as compared with the instance where it was not added.

TABLE 1—(a)

| | | Catalyst | | | | | | |
|---|---|---|---|---|---|---|---|---|
| | | Titanium halide | | Organoaluminum | | Mercaptide | | |
| No. | Monomer | Class | Amount, g. | Class | Amount, g. | Class | Amount, mg. | Solvent |
| Example: | | | | | | | | |
| 1 | Propylene | $3TiCl_3 \cdot AlCl_3$ [1] | 0.50 | $Al(C_2H_5)_2Cl$ | 0.90 | Copper ethyl mercaptide | 28 | n-Heptane 300 ml. |
| 2 | do | Same | 0.50 | Same | 0.90 | do | 46 | Do. |
| 3 | do | do | 0.50 | do | 0.90 | do | 56 | Do. |
| 4 | do | do | 0.50 | do | 0.90 | Sodium ethyl mercaptide | 17 | Do. |
| 5 | do | do | 0.50 | do | 0.90 | do | 50 | Do. |
| 6 | do | do | 0.50 | do | 0.90 | do | 84 | Do. |
| 7 | do | do | 0.50 | do | 0.90 | Lithium ethyl mercaptide | 27 | Do. |
| 8 | do | do | 0.50 | do | 0.90 | Lithium phenyl mercaptide | 23 | Do. |
| 9 | do | do | 0.50 | do | 0.90 | Copper phenyl mercaptide | 46 | Do. |
| 10 | do | do | 0.50 | do | 0.90 | Mercury ethyl mercaptide | 183 | Do. |
| 11 | do | do | 0.50 | do | 0.90 | Mercury lauryl mercaptide | 120 | Do. |
| 12 | do | do | 0.50 | do | 0.90 | Cadmium ethyl mercaptide | 187 | Do. |
| 13 | do | do | 0.50 | do | 0.90 | Tin butyl mercaptide | 238 | Do. |
| 14 | do | do | 0.50 | do | 0.90 | Lead lauryl mercaptide | 243 | Do. |
| 15 | do | do | 0.50 | do | 0.90 | Iron (III) methyl mercaptide | 39 | Do. |
| 16 | do | do | 0.50 | do | 0.90 | Iron (III) propyl mercaptide | 56 | Do. |
| 17 | do | do | 0.50 | do | 0.90 | Iron (III) lauryl mercaptide | 198 | Do. |
| 18 | do | do | 0.50 | do | 0.90 | Iron (III) phenyl mercaptide | 75 | Do. |
| 19 | do | do | 0.50 | do | 0.90 | Iron (III) benzyl mercaptide | 128 | Do. |
| 20 | do | do | 0.50 | do | 0.90 | Cobalt (II) ethyl mercaptide | 18 | Do. |
| 21 | do | do | 0.50 | do | 0.90 | Nickel (II) phenyl mercaptide | 55 | Do. |
| 22 | do | do | 0.50 | do | 0.90 | Manganese (II) lauryl mercaptide | 91 | Do. |
| Control 1 | do | do | 0.50 | do | 0.90 | Not added | 0 | Do. |
| Example 23 | do | do | 1.0 | do | 1.8 | Copper ethyl mercaptide | 920 | Do. |
| Control 2 | do | do | 1.0 | do | 1.8 | Not added | 0 | Do. |
| Example: | | | | | | | | |
| 24 | do | do | 0.5 | $Al(C_2H_5)_3$ | 0.9 | Iron (III) lauryl mercaptide | 132 | Do. |
| 25 | do | do | 0.5 | Same | 0.9 | Sodium ethyl mercaptide | 17 | Do. |
| Control 3 | do | do | 0.5 | do | 0.9 | Not added | 0 | Do. |
| Example: | | | | | | | | |
| 26 | do | $TiCl_3$ [2] | 0.5 | $Al(C_2H_5)_2Cl$ | 0.9 | Mercury lauryl mercaptide | 120 | Do. |
| 27 | do | Same | 0.5 | Same | 0.9 | Tin butyl mercaptide | 59 | Do. |
| Control | do | do | 0.5 | do | 0.9 | Not added | 0 | Do. |

[1] AA type.
[2] HA type.

TABLE 1—(b)

| | Polymerization conditions | | | Polypropylene | | |
|---|---|---|---|---|---|---|
| No. | Temp. (° C.) | kg./cm.² gauge | Time, hr. | Boiling heptane insoluble portion, percent | Inherent viscosity ($\eta$) | Yield, g. |
| Example: | | | | | | |
| 1 | 60 | 2 | 2 | 95.4 | 3.0 | 16.1 |
| 2 | 60 | 2 | 2 | 95.4 | 3.2 | 14.6 |
| 3 | 60 | 2 | 2 | 95.3 | 3.4 | 10.7 |
| 4 | 60 | 2 | 2 | 95.4 | 3.5 | 17.5 |
| 5 | 60 | 2 | 2 | 96.0 | 3.6 | 15.1 |
| 6 | 60 | 2 | 2 | 96.6 | 3.7 | 10.7 |
| 7 | 60 | 2 | 2 | 96.6 | 3.3 | 22.1 |
| 8 | 60 | 2 | 2 | 96.7 | 3.4 | 17.1 |
| 9 | 60 | 2 | 2 | 95.5 | 3.2 | 13.1 |
| 10 | 60 | 2 | 2 | 95.1 | 3.1 | 11.4 |
| 11 | 60 | 2 | 2 | 96.7 | 3.2 | 20.6 |
| 12 | 60 | 2 | 2 | 95.1 | 2.8 | 25.1 |
| 13 | 60 | 2 | 2 | 96.7 | 3.0 | 8.3 |
| 14 | 60 | 2 | 2 | 97.0 | 4.6 | 6.7 |
| 15 | 60 | 2 | 2 | 97.1 | 3.3 | 17.8 |
| 16 | 60 | 2 | 2 | 96.8 | 3.5 | 18.4 |
| 17 | 60 | 2 | 2 | 96.6 | 2.3 | 22.3 |
| 18 | 60 | 2 | 2 | 96.7 | 3.7 | 18.9 |
| 19 | 60 | 2 | 2 | 95.3 | 2.5 | 7.9 |
| 20 | 60 | 2 | 2 | 95.9 | 2.4 | 22.2 |
| 21 | 60 | 2 | 2 | 95.9 | 3.8 | 19.2 |
| 22 | 60 | 2 | 2 | 97.7 | 2.0 | 15.3 |
| Control 1 | 60 | 2 | 2 | 89.3 | 2.9 | 19.8 |
| Example 23 | 60 | 4 | 2 | 95.5 | 3.3 | 25.1 |
| Control 2 | 60 | 4 | 2 | 86.2 | 2.8 | 34.2 |
| Example: | | | | | | |
| 24 | 60 | 2 | 2 | 88.0 | 2.8 | 20.1 |
| 25 | 60 | 2 | 2 | 87.4 | 2.7 | 19.7 |
| Control 3 | 60 | 2 | 2 | 82.3 | 2.8 | 22.3 |
| Example: | | | | | | |
| 27 | 60 | 2 | 2 | 94.1 | 3.5 | 14.4 |
| Control 4 | 60 | 2 | 2 | 88.4 | 3.2 | 15.3 |

TABLE II-(a)

| No. | Monomer | Amount, g. | Catalyst | | | | | | Solvent |
|---|---|---|---|---|---|---|---|---|---|
| | | | Titanium halide | | Organoaluminum | | Mercaptide | | |
| | | | Class | Amount, g. | Class | Amount, g. | Class | Amount, mg. | |
| Example: | | | | | | | | | |
| 28 | Propylene | 84.0 | 3TiCl₃·AlCl₃ | 0.2 | Al(C₂H₅)₂Cl | 0.36 | Iron (III) lauryl mercaptide. | 132 | Propylene solvent without additions of other solvent. |
| 29 | do | 84.0 | Same | 0.2 | Same | 0.36 | Lithium ethyl mercaptide. | 14 | Do. |
| 30 | do | 84.0 | do | 0.2 | do | 0.36 | do | 14 | Do. |
| Control: | | | | | | | | | |
| 5 | do | 84.0 | do | 0.2 | do | 0.36 | Not added | 0 | Do. |
| 6 | do | 84.0 | do | 0.2 | do | 0.36 | do | 0 | Do. |

TABLE II-(b)

| | Polymerization conditions | | Polypropylene | | |
|---|---|---|---|---|---|
| | Temp. (°C.) | Time, hr. | Boiling heptane insoluble portion, percent | Inherent viscosity (η) | Yield, g. |
| Example: | | | | | |
| 28 | 60 | 2 | 95.8 | 3.6 | 72.6 |
| 29 | 60 | 2 | 96.5 | 3.7 | 70.4 |
| 30 | 40 | 2 | 97.1 | 3.9 | 48.5 |
| Control: | | | | | |
| 5 | 60 | 2 | 90.2 | 3.2 | 66.7 |
| 6 | 40 | 2 | 92.0 | 3.6 | 48.8 |

TABLE III—(a)

| No. | Monomer | Amount (g.) | Catalyst | | | | | | Solvent | Amount (ml.) |
|---|---|---|---|---|---|---|---|---|---|---|
| | | | Titanium halide | | Organoaluminum | | Mercaptide | | | |
| | | | Class | Amount (g.) | Class | Amount (g.) | Class | Amount (mg.) | | |
| Example: | | | | | | | | | | |
| 31 | Butene-1 | 38.0 | 3TiCl₃·AlCl₃ | 0.5 | Al(C₂H₅)₃ | 1.14 | Lithium phenyl mercaptide. | 22 | n-Heptane | 300 |
| 32 | do | 38.0 | Same | 0.5 | Same | 1.14 | Mercury ethyl mercaptide. | 183 | do | 300 |
| 33 | do | 38.0 | do | 0.5 | do | 1.14 | Tin butyl mercaptide. | 120 | do | 300 |
| 34 | do | 38.0 | do | 0.5 | do | 1.14 | Iron (III) lauryl mercaptide. | 66 | do | 300 |
| 35 | do | 38.0 | do | 0.5 | do | 1.14 | Iron (III) benzyl mercaptide. | 85 | do | 300 |
| 36 | do | 38.0 | do | 0.5 | do | 1.14 | Iron (III) phenyl mercaptide. | 75 | do | 300 |
| 37 | do | 38.0 | do | 0.5 | do | 1.14 | Manganese (II) lauryl mercaptide. | 92 | do | 300 |
| Control 7 | do | 38.0 | do | 0.5 | do | 1.14 | Not added | 0 | do | 300 |
| Example: | | | | | | | | | | |
| 38 | do | 38.0 | do | 0.5 | Al(C₂H₅)₂Cl | 0.9 | Lead lauryl mercaptide. | 122 | do | 300 |
| 39 | do | 38.0 | do | 0.5 | Same | 0.9 | Iron (III) phenyl mercaptide. | 75 | do | 300 |
| Control 8 | do | 38.0 | do | 0.5 | do | 0.9 | Not added | 0 | do | 300 |
| Example 40 | do | 41.6 | TiCl₃ ¹ | 0.5 | Al(C₂H₅)₃ | 0.8 | Sodium ethyl mercaptide. | 46 | do | 300 |
| Control 9 | do | 41.6 | Same | 0.5 | Same | 0.8 | Not added | 0 | do | 300 |

¹ HA type.

TABLE III—(b)

| No. | Polymerization Conditions | | | Polybutene-1 | | |
|---|---|---|---|---|---|---|
| | Temp., (°C.) | Pressure, kg./cm.², gauge | Time, hr. | Boiling ether insoluble portion, percent | Inherent viscosity (η) | Yield, g. |
| Example: | | | | | | |
| 31 | 60 | | 4 | 69.2 | 1.0 | 31.5 |
| 32 | 60 | | 4 | 65.9 | 1.2 | 28.4 |
| 33 | 60 | | 4 | 62.0 | 0.9 | 33.4 |
| 34 | 60 | | 4 | 65.3 | 1.4 | 33.4 |
| 35 | 60 | | 4 | 70.2 | 1.1 | 37.7 |
| 36 | 60 | | 4 | 68.2 | 1.2 | 32.9 |
| 37 | 60 | | 4 | 65.0 | 1.1 | 33.9 |
| Control 7 | 60 | | 4 | 55.6 | 1.0 | 33.3 |
| Example: | | | | | | |
| 38 | 60 | | 4 | 74.1 | 1.2 | 28.1 |
| 39 | 60 | | 4 | 72.8 | 1.3 | 27.4 |
| Control | 60 | | 4 | 58.0 | 1.1 | 35.4 |
| Example 40 | 70 | | 7 | 85.0 | 1.4 | 30.5 |
| Control 9 | 70 | | 7 | 76.0 | 1.3 | 38.0 |

We claim:
1. A process for producing solid, crystalline polyolefins which comprises polymerizing olefins of the formula

$$CH_2=CHR^2$$

wherein $R^2$ is an alkyl group of 1-4 carbon atoms, mixtures of said olefins, or mixtures of said olefins with ethylene in an amount that will provide in the resulting polyolefins no more than up to 10 mol percent of polymerized ethylene, said polymerization reaction being carried out in the presence of a catalytic amount of a three-component catalyst system obtained by mixing together
 (a) a titanium trihalide;
 (b) an organoaluminum compound of the formula $$AlR_nX_{3-n}$$

wherein R is an alkyl group of 1-8 carbon atoms, X is halogen and $n$ is an integer 2 to 3, and
 (c) a metal mercaptide of the formula $$M(SR')_m$$

wherein R' is a hydrocarbon group of 1-20 carbon atoms, M is a metal selected from the class consisting of the metals of Groups I$a$, I$b$, II$b$, IV$b$, VII$a$ and VIII of the Periodic Table of Elements, and $m$ is a number equal to the valence of said metal.

2. The process according to claim 1 wherein said titanium trihalide is selected from the group consisting of titanium trichloride and $3TiCl_3 \cdot AlCl_3$.

3. The process according to claim 1 wherein said organoaluminum compound is selected from the group consisting of triethylaluminum and diethylaluminum monochloride.

4. The process according to claim 1 wherein said metal mercaptide is represented by the formula $$M(SR')_m$$

wherein R' is a hydrogen group selected from the class consisting of alkyl groups of 1-20 carbon atoms, aryl groups of 6-12 carbon atoms and aralkyl groups of 7-20 carbon atoms, M is a metal selected from the group consisting of Li, Na, K, Cu, Ag, Au, Zn, Cd, Hg, Ge, Sn, Pb, Mn, Fe, Co and Ni, and $m$ is a number equal to the valence of said metal.

5. The process according to claim 1 wherein the mole ratio of the organoaluminum compound to the titanium trihalide ranges between 1:0.1 and 1:10 and the mole ratio of the organoaluminum compound to the metal mercaptide ranges between 1:0.005 and 1:5.

6. The process according to claim 1 wherein said alpha-olefin is selected from the group consisting of propylene and butene-1.

7. The process according to claim 1 wherein the polymerization reaction is carried out at a temperature of 0–150° C.

References Cited
UNITED STATES PATENTS 2,996,459  8/1961  Andersen et al. _____ 252—429
3,503,947  3/1970  Kosaka et al. _____ 260—94.9

JOSEPH L. SCHOFER, Primary Examiner

E. J. SMITH, Assistant Examiner

U.S. Cl. X.R.

252—429; 260—88.2